United States Patent
Sadeghi et al.

(10) Patent No.: US 9,998,387 B2
(45) Date of Patent: *Jun. 12, 2018

(54) APPARATUS, SYSTEM AND METHOD OF CONTROLLING DATA FLOW OVER A COMMUNICATION NETWORK

(71) Applicant: INTEL CORPORATION, Santa Clara, CA (US)

(72) Inventors: Bahareh Sadeghi, Portland, OR (US); Elad Levy, Rishon LeZion (IL); Rafal Wielicki, Gdansk (PL); Marek Dabek, Gdansk (PL); Oren Kedem, Modiin Maccabim-Reut (IL)

(73) Assignee: INTEL CORPORATION, Santa Clara, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/757,987

(22) Filed: Dec. 24, 2015

(65) Prior Publication Data
US 2016/0134551 A1    May 12, 2016

Related U.S. Application Data

(63) Continuation of application No. 13/798,513, filed on Mar. 13, 2013, now Pat. No. 9,240,951.
(Continued)

(51) Int. Cl.
*H04L 12/835* (2013.01)
*H04L 12/801* (2013.01)
(Continued)

(52) U.S. Cl.
CPC .............. *H04L 47/30* (2013.01); *H04L 47/39* (2013.01); *H04L 61/2038* (2013.01);
(Continued)

(58) Field of Classification Search
CPC ........ G06F 13/00–13/4295; G06F 2213/0042; G06F 2213/38; G06F 2213/3812;
(Continued)

(56) References Cited

U.S. PATENT DOCUMENTS 8,200,856 B2    6/2012 Guo et al.
9,240,951 B2 *  1/2016 Sadeghi ................. H04L 47/39
                                                  710/56
(Continued)

OTHER PUBLICATIONS

Wireless-Gigabit-Alliance (WGA) specifications (Wireless Gigabit Alliance, Inc WiGig MAC and PHY Specification Version 1.0, Final specification), Apr. 2010. 311 pages.
(Continued)

*Primary Examiner* — Timothy J Weidner
(74) *Attorney, Agent, or Firm* — Shichrur & Co.

(57) ABSTRACT

Some demonstrative embodiments include apparatuses, systems and/or methods of controlling data flow over a communication network. For example, an apparatus may include a communication unit to control the transfer of a stream of data from a first device to a second device over a communication link, the stream of data including data to be delivered to a plurality of endpoints. For example, the controlling may include communicating between the first and second devices at least one message including at least one endpoint-specific credit consumption unit (CCU) defined with respect to at least one endpoint of the plurality of endpoints.

40 Claims, 4 Drawing Sheets

Related U.S. Application Data

(60) Provisional application No. 61/729,368, filed on Nov. 22, 2012.

(51) Int. Cl.
  *H04L 29/12* (2006.01)
  *H04L 29/08* (2006.01)
  *G06F 13/38* (2006.01)

(52) U.S. Cl.
  CPC .......... *H04L 69/323* (2013.01); *G06F 13/387* (2013.01); *G06F 2213/0042* (2013.01); *G06F 2213/3812* (2013.01)

(58) Field of Classification Search
  CPC ..... H04L 47/00–47/829; H04L 49/30–49/309; H04L 61/2038; H04L 69/30–69/329; H04W 72/04–72/0433
  See application file for complete search history.

(56) References Cited

U.S. PATENT DOCUMENTS

| | | |
|---|---|---|
| 2008/0222532 A1 | 9/2008 | Mester et al. |
| 2012/0026987 A1 | 2/2012 | Jain et al. |
| 2012/0320909 A1 | 12/2012 | Ziegler et al. |
| 2013/0282938 A1 | 10/2013 | Huang et al. |
| 2014/0047141 A1* | 2/2014 | Sadeghi .............. G06F 13/4291 710/56 |

OTHER PUBLICATIONS

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012. 2793 pages.

Wi-Fi Alliance Technical Committee P2P Task Group. Wi-Fi Peer-to-Peer (P2P) Technical Specification. Version 1.2; Dec. 14, 2011; 160 pages.

Universal Serial Bus Mass Storage Class—Bulk-Only Transport, Revision 1.0, Sep. 31, 1999; 22 pages.

Universal Serial Bus Specification, Revision 2.0; Apr. 27, 2000, 650 pages.

Universal Serial Bus 3.0 Specification (including errata and ECNs through May 1, 2011); Revision 1.0; Jun. 6, 2011. 534 pages.

Office Action for U.S. Appl. No. 13/798,513, dated Feb. 3, 2015, 42 pages.

* cited by examiner

APPARATUS, SYSTEM AND METHOD OF CONTROLLING DATA FLOW OVER A COMMUNICATION NETWORK

CROSS REFERENCE

This application is a Continuation application of U.S. patent application Ser. No. 13/798,513, filed on Mar. 13, 2013, which claims the benefit of and priority from U.S. Provisional Patent Application Ser. No. 61/729,368 entitled "Apparatus, System, and Method of Controlling Data Flow Over a Wireless Communication Link", filed Nov. 22, 2012, the entire disclosures of which are incorporated herein by reference.

TECHNICAL FIELD

Embodiments described herein generally relate to controlling data flow over a communication network.

BACKGROUND

Some wireless communication technologies may be configured for communication of various dedicated services.

For example, the Wireless-Gigabit (WiGig) technology, e.g., according to the *Wireless Gigabit Alliance, Inc WiGig MAC and PHY Specification Version 1.1, April* 2011, *Final specification*, is designed to carry multiple dedicated services, such as audio-visual (A/V) and input output (I/O).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer.

The WSE defines a WSE host communicating with a WSE device over a WiGig wireless link interface. The WSE host can connect and control several WSE devices. Each WSE device can include several USB ports, and each USB port can be attached to a USB device or be extended to several ports via a USB hub.

Since USB devices and/or USB hosts may be configured for communicating over a physical medium, e.g., a USB cable, there may be a problem to perform some operations, e.g., in an efficient seamless and/or transparent manner, via the WSE PAL.

The WSE device typically includes a buffer for buffering data received from the WSE host to be delivered to USB devices integrated within or connected to the WSE device. The size of the buffer may affect throughput and/or latency of the data flow between the host and the USB devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
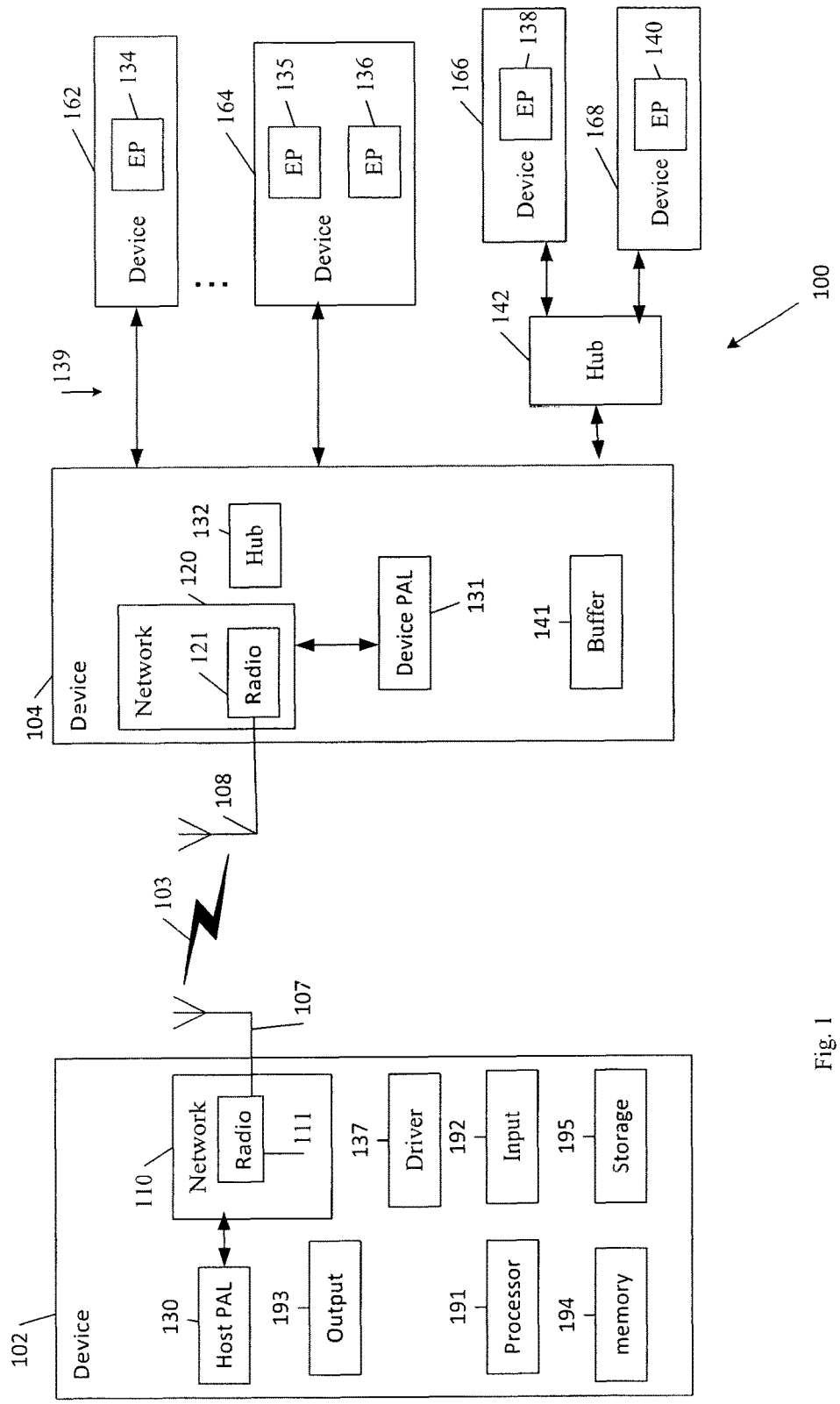
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing WiGig Serial Extension (WSE) protocols (*WiGig Serial Extension* (*WSD*) *Specification Draft* 1.02, *August* 2012) and/or future versions and/or derivatives thereof, devices and/or networks operating in accordance with existing WiGig Display Extension (WDE) protocols (*WDE Draft Specification* 1.04, *August* 2012) and/or future versions and/or derivatives thereof, devices and/or networks operating in accordance with existing WiGig Bus Extension (WBE) protocols (*WiGig Bus Extension Spec* (*WBE*), *Version* 1.0 *June* 2011) and/or future versions and/or derivatives thereof, devices and/or networks operating in accordance with existing WiGig Secure Digital (SD) Extension (WSD) protocols (*WiGig SD Extension* (*WSD*) *PAL Specification Draft* 1.0 *August* 2012) and/or future versions and/or derivatives thereof, devices and/or networks operating in accordance with existing Bulk Only Transfer (BOT) Protocols (*Universal Serial Bus* (*USB*) *Mass Storage Class Bulk-Only Transport, Revision* 1.0, *Sep*. 31, 1999) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar*. 29, 2012; IEEE802.11 task group ac (TGac) ("*IEEE*802.11-09/0308*r*12 —*TGac Channel Model Addendum Document*"); *IEEE* 802.11 *task group ad* (*TGad*) (*IEEE P*802.11*ad/D*9.0 *Draft Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 5: *Enhancements for Very High Throughput in the* 60 *GHz Band*)), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WiGig, Wi-Fi, Internet-Protocol (IP), Wi-Max, ZigBee™, Ultra-Wideband (UWB), Global System for Mobile communication (GSM), 3rd Generation Partnership Project (3GPP), 2G, 2.5G, 3G, 3.5G, Long Term Evolution (LTE), LTE advanced, Fifth Generation (5G) mobile networks, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a WiGig frequency band according to the WGA specification, a WiFi band, a P2P band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to device communication.

The phrase "Protocol Adaptation Layer (PAL)", as used herein, may include an abstraction layer configured to enable transporting traffic of at least one predefined protocol over a communication link. The predefined standard may include, for example, a specific industry-standard protocol, e.g. USB, DisplayPort, and the like. The PAL may be above a data link layer, for example, a MAC layer, and/or above a transport layer, e.g., a Transmission Control Protocol (TCP) or User Datagram Protocol (UDP), which is above the data link layer. In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

Some demonstrative embodiment are described herein with respect to a PAL connection over a wireless communication link, for example, a WiGig link, e.g., as described below. However, other embodiments may include a PAL connection over any other wired or wireless communication MAC layer link, e.g., an IP link.

The phrase "PAL communication unit", as used herein, may include a communication element to manage and/or control a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit.

In some demonstrative embodiments, the PAL communication unit (also referred to as "PAL manager", "PAL communication controller" or "PAL controller") may perform the functionality of, may include, or may be implemented as part of a WSE Service Set (WSS). For example, the PAL communication unit may perform at least part of the functionality of a WSE device or a WSE host, e.g., as described below. In other embodiments, the PAL communication unit may perform the functionality of any other PAL device, element and/or module.

The phrase "WSE device", as used herein, may include, for example, a WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. In one example, the integrated device may be presented through the WSE device to a host as a USB device compliant with a USB specification, e.g., the USB 2.0 and/or USB 3.0 Specifications.

In one example, the WSE device may optionally include any computing platform, e.g., a portable device, which houses and/or performs the functionality of the WSE device and, optionally, one or more additional elements, e.g., drivers and/or application software, configured to perform the functionality of a peripheral device. In other embodiments, the WSE device may include and/or may be implemented by any other portable or non-portable device.

In some demonstrative embodiments, the WSE device may include USB device logic, e.g., for communicating with a USB device according to a USB Specification, a WSE device PAL, e.g., to control communication over the PAL, and a network interface, e.g., to communicate over the communication link. For example, the WSE device PAL may interface between the USB device logic and the network interface, e.g., in a transparent manner. In other embodiments, the WSE device may include any other elements. In one example, the PAL communication unit may perform the functionality of at least the WSE device PAL, e.g., a device USB PAL.

The phrase "WSE host", as used herein, may include an architectural element of the WSE PAL that includes a communication architecture, e.g., a WiGig MAC and PHY, and USB host logic, e.g., as defined by a USB Specification, e.g., the USB 2.0 and/or USB 3.0 Specifications.

In one example, the WSE host may optionally include any computing platform, e.g., a personal computer, which houses and/or performs the functionality of the WSE host and, optionally, one or more additional elements, e.g., drivers and/or application software, configured to perform the functionality of a host device. In other embodiments, the WSE host may include and/or may be implemented by any other portable or non-portable device.

In some demonstrative embodiments, the WSE host may include USB host logic, e.g., for communicating with a USB host according to a USB Specification, a WSE host PAL, e.g., to control communication over the PAL, and a network interface, e.g., to communicate over the communication link. For example, the WSE host PAL may interface between the USB host logic and the network interface, e.g., in a transparent manner. In other embodiments, the WSE host may include any other elements. In one example, the PAL communication unit may perform the functionality of at least the WSE host PAL, e.g., a host USB PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a WSE device and the second device may include a WSE host. For example, the endpoint may belong to a USB device, e.g., a USB device, which may be integrated into the WSE device or connected, e.g., through a wired USB connection, to the WSE device, e.g., via a hub integrated into the WSE device.

According to this example, the endpoint may be uniquely identified by the WSE host. For example, a combination of a WSE device address of the WSE device and a WSE EP handle assigned to the endpoint may uniquely identify a USB device endpoint within a WSE service set.

In other examples, the first and second devices may include any other, e.g., non-WSE and/or non-USB, device and the endpoint may perform the functionality of any other, e.g., non-USB and/or non-WSE, element.

Reference is now made to FIG. 1, which schematically illustrates a block diagram of a system 100, in accordance with some demonstrative embodiments.

As shown in FIG. 1, in some demonstrative embodiments, system 100 may include a communication network including one or more communication devices, e.g., communication devices 102 and/or 104, capable of communicating content, data, information and/or signals over a communication medium, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include, for example, a PC, a desktop computer, a mobile computer, a laptop computer, a notebook computer, a tablet computer, an Ultrabook™ computer, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 104 may include network interfaces 110 and 120, respectively, to perform communication over a communication network between communication devices 102 and 104 and/or with one or more other devices, e.g., as described below.

Devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

In some demonstrative embodiments, network interfaces 110 and/or 120 may include wireless communication units, e.g., including radios 111 and 121, to communicate over a wireless communication medium. For example, radios 111 and/or 121 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, radios 111 and/or 121 may include one or more wireless transmitters, receivers and/or transceivers able to send and/or receive wireless communication signals, RF signals, frames, blocks, transmission streams, packets, messages, data items, and/or data. For example, radios 111 and/or 121 may include or may be implemented as part of a wireless Network Interface Card (NIC), and the like.

In some demonstrative embodiments, devices 102 and 104 may establish a communication link 103. Link 103 may be configured for communication over a data link layer, e.g., the MAC layer, a logical link control (LLC) and/or a transport layer. Link 103 may include an uplink and/or a downlink. For example, the uplink may include a link for communicating data from device 104 to device 102, and/or the downlink may include a link for communicating data from device 102 to device 104. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, link 103 may include a wireless communication link, for example, a WiGig link, e.g., as described below. In other embodiments, link 103 may include any other wireless or wired link, e.g., an IP link. According to these embodiments, network interfaces 110 and/or 120 may include any suitable communication unit, e.g., a wired or wireless communication unit, to communicate over the communication network.

In some demonstrative embodiments, devices 102 and 104 may form, or may be part of, a wireless communication network. The wireless communication network may include, for example, a P2P network or any other network.

In some demonstrative embodiments, devices 102 and/or 104 may perform the functionality of DMG stations ("DMG STA"). For example, communication devices 102 and/or 104 may be configured to communicate over the DMG band.

In some demonstrative embodiments, device 102 may include a mobile device and device 104 may include a docking device to connect device 102 to one or more other devices ("peripherals"), for example, including one or more USB devices, e.g., devices 162, 164, 166 and/or 168, and/or any other device.

For example, device 102 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB2 interface supporting a data rate of 480 Mbps, and/or device 104 may be connected to one or more of devices 162, 164, 166 and/or 168 via a third USB interface 139 supporting a third data transfer rate, e.g., a USB3 interface supporting a data transfer rate of up to 4.8 Giga bit per second (Gbps).

In some demonstrative embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 102 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may perform the functionality of one or more Endpoints (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 138.

In some demonstrative embodiments, device 102 may include a PAL communication unit 130, and device 104 may include a PAL communication unit 131. PAL communication units 103 and 131 may be configured to manage a PAL connection between devices 102 and 104 over link 103.

In some demonstrative embodiments, devices 102 and 104 may communicate over link 103 according to a WiGig protocol.

In some demonstrative embodiments, devices 102 and 104 may be configured for communication of various dedicated services. For example, the WiGig technology is designed to carry multiple dedicated services, such as audio-visual (A/V) and input output (I/O).

Some demonstrative embodiments are described herein with reference to communicating a data stream including USB data over a wireless communication link according to a WSE protocol. However, other embodiments may be implemented with respect to communicating any other suitable data over any other communication link, according to any other communication protocol and/or over any other layer or PAL.

In some demonstrative embodiments, device 102 may perform the functionality of a USB host and device 104 may perform the functionality of a USB device.

In some demonstrative embodiments, PAL communication unit 130 may perform the functionality of a WSE host and PAL communication unit 131 may perform the functionality of a WSE device.

In some demonstrative embodiments, PAL communication units 130 and 131 may communicate USB traffic over the WSE PAL via link 103. The USB traffic may include, for example, non-periodic (NP) traffic, e.g., bulk and/or control traffic, and/or periodic traffic, e.g., Isochronous and/or Interrupt traffic, which may be communicated by the EPs 134, 135, 136, 138 and/or 140.

In some demonstrative embodiments, the periodic traffic may be required to be conducted under a certain bandwidth (BW) and latency Service Level Agreement (SLA), while the NP traffic may be communicated according to a best-effort (BE), potentially "greedy", scheme, which may be less sensitive to latency. There may also be some, e.g., low, BW requirements for management and/or control traffic of the WSE PAL.

In some demonstrative embodiments, the USB traffic may include traffic ("USB IN") delivered from the EPs the EPs 134, 135, 136, 138 and/or 140, via device 104, to device 102, and/or traffic ("USB OUT") delivered from device 102, via device 104, to the EPs the EPs 134, 135, 136, 138 and/or 140.

In some demonstrative embodiments, the USB PAL may enable transport of USB data over media other than USB cable, for example, wireless links, e.g., Wi-Fi or WiGig links, or wired links, e.g., Ethernet. The USB PAL may directly interface with network interfaces 110 and 120, e.g., to replace a network layer in the Open Systems Interconnection (OSI) model, or may be an IP application, interfacing with an IP (e.g., TCP/IP or UDP/IP) stack.

In some demonstrative embodiments, PAL communication unit 130 and PAL communication unit 131 may be configured to enable media-agnostic connectivity of a PAL between devices 102 and 104.

In some demonstrative embodiments, PAL communication unit 130 and PAL communication unit 131 may be configured to enable connectivity of the PAL between devices 102 and 104 over a wireless communication link, for example, a WiGig link, e.g., as described below. However, in other embodiments, PAL communication unit 130 and PAL communication unit 131 may be configured to enable media-agnostic connectivity of the PAL between devices 102 and 104 over any other medium, for example, a Wi-Fi link, an IP link, e.g., internet, Ethernet, over wire or wireless, and the like.

In some demonstrative embodiments the USB PAL may replace a USB physical cable.

In one example, PAL communication unit 130 may perform the functionality of a host USB PAL and/or PAL communication unit 131 may perform the functionality of a device USB PAL.

For example, PAL communication units 130 and 131 may be configured to interface, e.g., over link 103, between USB host logic, for example, a USB driver at a host platform, e.g., a USB device interface (USBDI) of device 102, e.g., a driver 137, and a USB controller of device 104.

According to this example, the combination of PAL communication unit 130, network interface 110, network interface 120, and PAL communication unit 131 may be configured to replace and/or emulate the USB physical cable for connecting between a host device, e.g., device 102, and a USB device, e.g., included by or connected to device 104.

In some demonstrative embodiments, PAL communication units 130 and 131 may be configured to communicate over a USB PAL between a USB host and a USB device. The USB PAL may enable efficient transport of USB traffic by transmitting USB transfers, as opposed to USB transactions. USB transfers may include larger pieces of data, which may be more appropriate for transmission over the wireless links.

However, built-in flow mechanisms for transport of data in USB may not be used, for example, if USB link access mechanisms are not used by the USB PAL.

In some demonstrative embodiments, the USB PAL may utilize a dedicated USB PAL transfer protocol, which may be configured to effectively handle transfer scenarios that may happen as in wired USB, including, for example, an OUT transfer, which includes data to be transferred from the WSE host to a USB device, e.g., an endpoint of the USB device.

In some demonstrative embodiments, a wireless communication data rate of communication link 103, which may be utilized for communication between devices 102 and 104, may be different from and/or not synchronized with, the data rate supported by the USB interfaces 139, which may be utilized for USB communication between device 104 and EPs 134, 135, 136, 138 and/or 140.

In some demonstrative embodiments, device 104 may include a buffer 141, which may be configured to buffer data communicated between device 102 and EPs 134, 135, 136, 138 and/or 140. For example, buffer 141 may buffer data received from device 102 over link 103 and intended for an endpoint of EPs 134, 135, 136, 138 and/or 140 and/or hub 132, e.g., until the data is successfully transferred from device 104 to the endpoint.

In some demonstrative embodiments, PAL communication units 130 and 131 may utilize a flow control mechanism to manage the buffer space of buffer 141. For example, the flow control mechanism may be configured to ensure that there is buffer space available on buffer 141 for the data that is being transmitted, e.g., to avoid packet drop and/or waste of the resources utilized for transmission of the data between the devices 102 and 104; and/or to ensure that there is no data on device 102 waiting for transmission while there is buffer available in buffer 141. Buffer management may be especially critical, e.g., for wireless docks (wireless USB hubs), where the buffer space may be shared among multiple USB devices.

In some demonstrative embodiments, data transfers ("transactions") between device 104 and EPs 134, 135, 136, 138 and/or 140 may be initiated by a host, e.g., by device 102. For example, device 102 may include at least one driver 137, e.g., a USB device driver, configured to transfer data between device 102 and EPs 134, 135, 136, 138 and/or 140, e.g., via device 104.

In some demonstrative embodiments, driver 137 may trigger an IN transfer, e.g., a "read" transaction for reading data from an EP. For example, driver 137 may allocate a buffer in memory 194 to receive the data transferred from the EP.

In some demonstrative, driver 137 may trigger an OUT transfer, e.g., a "write" transaction for writing data from device 102 to an EP. For example, driver 137 may send the data to device 104, e.g., over link, device 104 may buffer the data in buffer 141, and may transfer the data to the EP.

Some demonstrative embodiments are described herein with reference to communicating a data stream including USB data over a wireless communication link according to a WSE protocol. However, other embodiments may be implemented with respect to communicating any other suitable data over any other communication link, according to any other communication protocol and/or over any other layer or PAL.

In some demonstrative embodiments, PAL communication unit 130 may send the OUT EP transaction data intended for an EP as part of one or more transfer request ("TransferReq" or "T.req") messages transmitted from device 102 to device 104 over communication link 103. For example, the OUT EP transaction data may be fragmented into a plurality of data blocks to be transmitted as part of a respective plurality of transfer request messages.

In some demonstrative embodiments, PAL communication unit 131 may be configured to control a data flow of a stream of data from device 102 to device 104 over communication link 103. The stream of data may include, for example, data to be delivered to endpoints 134, 135, 136, 138 and/or 140.

In some demonstrative embodiments, PAL communication units 130 and 131 may be configured to utilize one or more buffer management and/or flow control mechanisms, in which PAL communication unit 131 may dynamically report to PAL communication unit 130 the available buffer space for an endpoint (flow), e.g., for each of endpoints 134, 135, 136, 138 and 140. PAL communication unit 130 may use the reported buffer space to flow control and regulate the traffic targeted for the endpoint.

In some demonstrative embodiments, the dynamic and accurate tracking of the available buffer space on device 104, which may be required to ensure high performance, may impose complexity on devices 102 and/or 104, e.g., which may have, in some implementations, relatively low processing power and/or limited capabilities.

In some demonstrative embodiments, PAL communication unit 131 may utilize a credit allocation mechanism to allocate buffer 141 for buffering data to be delivered to endpoints 134, 135, 136, 138 and/or 140. For example, PAL communication unit 131 may allocate to PAL communication unit 130 a plurality of credit allocations ("credits") corresponding to a plurality of endpoints intended to receive data from device 102 via link 103. Device 102 may transmit the data stream to device 104 via link 103 according to the allocated credit, e.g., as described below.

The term "credit" as used herein may refer to any suitable indication of a permitted amount of data, which is permitted by a first device, for transferring data from a second device to the first device. The credit may include any suitable indication of the permitted amount of data.

In some demonstrative embodiments, PAL communication unit 131 may allocate the credit in the form of a number of credit consumption units (CCUs), each CCU representing a predefined data size, for example, in terms of bytes (b), e.g., 512 b, or any other data size.

For example, PAL communication unit 131 may allocate to PAL communication unit 130 credit for communicating data intended for an EP, e.g., by allocating to PAL communication unit 130 a number of CCUs representing an amount of data intended for the EP, which PAL communication unit 130 is permitted to communicate to PAL communication unit 131 over communication link 103.

In some demonstrative embodiments, a transfer request message may include, for example, a data block of the OUT transfer data fro an EP, an EP identifier (ID) identifying the EP intended to receive the data block, and a Request identifier (RequestID) identifying the data block, e.g., in relation to one or more other data blocks of the OUT transfer data. The transfer request message may also include an indication (RemSize) of remaining data size of the OUT transfer data to be transmitted as part of one or more subsequent transfer request messages. In other embodiments, the transfer request message may have any other structure and/or may include any other alternative and/or additional information.

In some demonstrative embodiments, PAL communication unit 131 may send to PAL communication unit 130 a transfer response message ("TransferResp" or "T.Rsp") in response to the transfer request message. The transfer response message may include an indication of the credit allocated to the EP of the requested transfer.

In some demonstrative embodiments, the buffer size of buffer 141 may be limited, expensive and/or relatively small. Accordingly, efficient utilization of buffer 141 may enable increasing a throughput of the data flow over link 103, increasing a throughput of the data flow between device 102 and endpoints 134, 135, 136, 138 and/or 140, reducing a latency of the data flow between device 102 and endpoints 134, 135, 136, 138 and/or 140, and/or reducing a production cost of device 104.

In one example, device 102 may be required to defer transmission of data to device 104 over communication link 103, e.g., if a size of the data to be transmitted is greater than an allocated credit corresponding to an endpoint intended to receive the data. Increasing the utilization efficiency of buffer 141 may enable allocating greater credit to the endpoint and, accordingly, may reduce a latency of transferring the data from device 102 to the endpoint.

In some demonstrative embodiments, PAL communication unit 131 may provide the CCU to PAL communication unit 130, e.g., as part of a capability exchange procedure, which may be part of a session establishment process between PAL communication units 130 and 131, e.g., following the establishment of communication link 103.

In some demonstrative embodiments, buffer management of buffer 141 may be performed per USB endpoint, e.g., per endpoints 134, 135, 136, 138 and 140.

In some demonstrative embodiments, one or more different endpoints, e.g., endpoints 134, 135, 136, 138 and 140, may have different requirements and/or traffic characteristics.

In some demonstrative embodiments, using a common CCU value for all endpoints may result in inefficient use of the buffer space of buffer 141.

In one example, a first endpoint, e.g., endpoint 135, may include an endpoint characterized by traffic of a reduced size, e.g., a control endpoint; and a second endpoint, e.g., endpoint 136, may include an endpoint characterized by traffic of an increased size. For example, the traffic to endpoint 135 may be characterized by a data size of up to 4 Kilobyte (Kb), and/or the traffic to endpoint 135 may be characterized by a data size of at least 16 kB.

Accordingly, it may be beneficial to manage the traffic to the first endpoint according to a first CCU, and to manage the traffic to the second endpoint according to a second CCU, e.g., such that the second CCU is lesser than the first CCU. For example, it may be beneficial to manage the traffic to endpoint 135 according to a first CCU, e.g., of 512 bytes (b), and to manage the traffic to endpoint 136 according to a second CCU, e.g., of 2048 b.

In some demonstrative embodiments, PAL communication unit 131 may be configured to define a plurality of CCUs, e.g., including two or more different CCUs, corresponding to a plurality of endpoints. In one example, PAL communication unit 131 may define at least two different CCUs to be utilized for allocating credit with respect to endpoints 134, 135, 136, 138 and/or 140.

In one example, PAL communication unit 131 may define a first CCU, e.g., 512 b or any other CCU, to be utilized for credit allocation with respect to one or more first endpoints, e.g., a control endpoint, and a second CCU, e.g., 2048 b or any other CCU, to be utilized for credit allocation with respect to one or more second endpoints, e.g., a high traffic endpoint.

In some demonstrative embodiments, PAL communication unit 131 may determine a CCU corresponding to an endpoint based on endpoint information corresponding to the endpoint.

In some demonstrative embodiments, the endpoint information may include, for example, information relating to a stream type to be communicated to the endpoint, e.g., a control stream, an audio stream, a video stream, a periodic stream, a non-periodic stream, an isochronous (ISO) stream, an asynchronous stream, an internet-protocol (IP) stream, a high priority IP stream, a low priority IP stream, a bulk stream, a Best Effort (BE) stream, a BOT stream, and/or any other stream; information relating to a traffic rate utilized by the endpoint; information relating to a size of data blocks to be communicated to the endpoint, and/or any other information relating to one or more attributes of the endpoint, the device including the endpoint and/or the stream to be communicated to the endpoint.

In some demonstrative embodiments, defining different CCU values with respect to the endpoints, e.g., in an endpoint-specific manner, and/or defining a low-overhead mechanism for reporting of the value of each CCU to the host, may enable efficient use of buffer 141.

In some demonstrative embodiments, PAL communication unit 131 may be configured to define the CCU per endpoint. In other embodiments, PAL communication unit 131 may define the CCU per group of endpoints, or according to any other scheme.

In some demonstrative embodiments, defining the CCU per endpoint, may enable PAL communication unit 131 to intelligently choose the CCU value per requirements and/or traffic characteristics of the endpoint, for example, such that usage of buffer 141 is optimized, e.g., while ensuring low complexity tracking of the buffer space for the endpoint.

In some demonstrative embodiments, PAL communication unit 131 may be configured to communicate to PAL communication unit 130 one or more CCU values defined with respect to one or more of endpoints 134, 135, 136, 138 and 140. PAL communication unit 130 may utilize the CCUs with respect to credit allocations form PAL communication unit 131.

In some demonstrative embodiments, the CCU corresponding to the endpoint may define a unit by which a WSE host, e.g., PAL communication unit 130, is to keep track of buffer space available on a buffer of a WSE device, e.g., buffer 141, for buffering data intended for the endpoint.

In some demonstrative embodiments, a WSE host and a WSE device, e.g., PAL communication units 130 and 131, may communicate granted credit, which is allocated with respect to an endpoint. The granted credit may be represented as a multiple of the CCU defined for the endpoint. For example, the granted credit may be represented by an integer number representing the number of CCUs.

In some demonstrative embodiments, PAL communication unit 130 may receive from PAL communication unit 131 the CCU defined with respect to the endpoint, and may account for consumed credits for the endpoint in multiples of the CCU, e.g., regardless of an amount of data to be transferred from device 102 to the endpoint.

In one example, a WSE device, e.g., PAL communication unit 131, may report to a WSE host, e.g., PAL communication unit 130, a CCU of 512 b for a particular endpoint.

According to this example, the WSE host may account, e.g., may always account, for used credits for the particular endpoint in units of 512 b, e.g., regardless of the number of bytes to be actually transmitted by the WSE host to the particular endpoint. For example, a WSE payload of 2064 bytes may account for 5 CCUs.

In some demonstrative embodiments, PAL communication unit 131 may be configured to communicate with PAL communication unit 130 a CCU defined with respect to an endpoint, e.g., as described below.

In some demonstrative embodiments, PAL communication unit 131 may be configured to communicate with PAL communication unit 130 two or more different CCUs defined with respect to two or more endpoints.

In some demonstrative embodiments, PAL communication unit 131 may be configured to communicate with PAL communication unit 130 at least one message including at least one identifier of an endpoint and a CCU defined with respect to the endpoint.

For example, PAL communication unit 131 may be configured to communicate with PAL communication unit 130 at least one message including at least one endpoint descriptor corresponding to at least one endpoint. The endpoint descriptor may include, for example, a CCU defined with respect to the endpoint, e.g., as described below.

In some demonstrative embodiments, PAL communication unit 131 may be configured to communicate with PAL communication unit 130 at least one message including at least two different CCUs defined with respect a plurality of endpoints.

For example, PAL communication unit 131 may be configured to communicate with PAL communication unit 130 at least one message including two or more endpoint descriptors corresponding to two or more endpoints. The two or more endpoint descriptors may include two or more different CCUs defined with respect to the two or more endpoints.

In one example, PAL communication unit 131 may communicate with PAL communication unit 130 a message including an endpoint descriptor corresponding to endpoint 135 and including a CCU defined for endpoint 135, and an endpoint descriptor corresponding to endpoint 136 and including a CCU defined for endpoint 136. The CCU defined for endpoint 135 may be different from the CCU defined for endpoint 136. Alternatively, the descriptors corresponding to both endpoints 135 and 136 may include the same CCU defined for both endpoints 135 and 136.

In some demonstrative embodiments, during an enumeration process of a device, e.g., a USB device, of devices 162, 164, 166 and/or 168, PAL communication unit 130 may request a handle to be allocated by PAL communication unit 131 for endpoints, e.g., every endpoint, on the device.

For example, PAL communication unit 130 may transmit to PAL communication unit 131 a message, e.g., an Endpoint Handle Request, requesting a handle to be allocated by PAL communication unit 131 for every endpoint on a USB device.

In some demonstrative embodiments, PAL communication unit 131 may return the allocated endpoint handles to PAL communication unit 130, for example, in response to the endpoint handle request, e.g., using an Endpoint Handle Response message.

In some demonstrative embodiments, PAL communication unit 131 may also include in the Endpoint Handle Response information required for USB PAL operations for the endpoints of the USB device.

In some demonstrative embodiments, PAL communication unit 130 may include one or more CCUs defined for one or more endpoints of a device, e.g., as part of the Endpoint Handle Response message sent from PAL communication unit 131 to PAL communication unit 130. In other embodiments, PAL communication unit 130 may include the one or more CCUs as part of any other solicited or unsolicited message.

In one example, PAL communication unit 130 may transmit to PAL communication unit 131 an Endpoint Handle Request to assign handles to endpoints of device 164. PAL communication unit 131 may transmit to PAL communication unit 130 an Endpoint Handle Response message including an EP descriptor of EP 135, including the CCU defined for EP 135, and an endpoint descriptor of EP 136, including the CCU defined for EP 136.

In some demonstrative embodiments, at the time of session establishment between PAL communication units 130 and 131, PAL communication unit 131 may not necessarily have information regarding the number and/or type of the endpoints. Accordingly, the decision regarding the value of the CCU may not be correlated with the requirements and/or traffic characteristics of the endpoints. This may result in reduced efficiency.

In some demonstrative embodiments, PAL communication unit 131 may be configured to learn about the devices, e.g., USB devices and/or endpoints, which are "behind" the PAL communication unit 131 (being managed by the USB PAL), e.g., in a low complexity manner.

In some demonstrative embodiments, learning the device type and/or characteristics may help PAL communication unit 131 to make intelligent decisions regarding the resources to be allocated to the devices, which may further lead to higher efficiency.

In some demonstrative embodiments, it may not be efficient to configure PAL communication unit 131 to learn about USB device type and capabilities, for example, by examining control transfers, e.g., USB control transfers, that are tunneled as data packets between PAL communication unit 130 and PAL communication unit 131.

For example, examining the USB control transfers, e.g., in order to find the commands asking for the device descriptor of the USB device, and then reading the device descriptor in the payload of the response may incur, for example, high overhead.

In some demonstrative embodiments, PAL communication unit 130 may be configured to explicitly communicate to PAL communication unit 131 a device descriptor, e.g., a USB device descriptor, of a device, e.g., a USB device, including the endpoints, for example, as part of an explicit message communicated to PAL communication unit 131. Explicitly communicating the device descriptor to PAL communication unit 131 may, for example, reduce the complexity associated with the process for PAL communication unit 131 to learn the device type and/or characteristics.

In one example, a USB device descriptor corresponding to a USB device may include, for example, information relating to a type of the USB device, e.g., a storage device, a keyboard, a mouse, and the like; information relating to a communication protocol utilized by the device, e.g., the USB 2.0 protocol, the USB 3.0 protocol, and the like; and/or any other information. The device descriptor may include for example, a USB device descriptor, e.g., as defined by the USB 2.0 and/or USB 3.0 Specifications.

In some demonstrative embodiments, PAL communication unit 130 may be configured to use a low overhead mechanism to communicate the device descriptor to PAL communication unit 131, e.g., as described below.

In some demonstrative embodiments, PAL communication unit 130 may be configured to include the USB device descriptor in a packet communicated by PAL communication unit 130 to PAL communication unit 131, e.g., during the enumeration process.

In some demonstrative embodiments, PAL communication unit 130 may be configured to include the USB device descriptor in a packet communicated by PAL communication unit 130 to PAL communication unit 131, e.g., following a step through which the PAL communication unit 130 learns the device descriptor and, for example, before the endpoint handles are requested from the PAL communication unit 131.

In some demonstrative embodiments, PAL communication unit 130 may be configured to include the USB device descriptor as part of an Update Device Request message transmitted from PAL communication unit 130 to PAL communication unit 131.

In some demonstrative embodiments, PAL communication unit 130 may communicate to PAL communication unit 131 a control transfer request for control information including a device descriptor of a device of devices 162, 164, 166 and 168. PAL communication unit 131 may communicate to PAL control unit 130 a control transfer response including the control information, and PAL communication unit 130 may communicate a message, e.g., an update device request, including the device descriptor, which was included in the control information.

Figure 2:
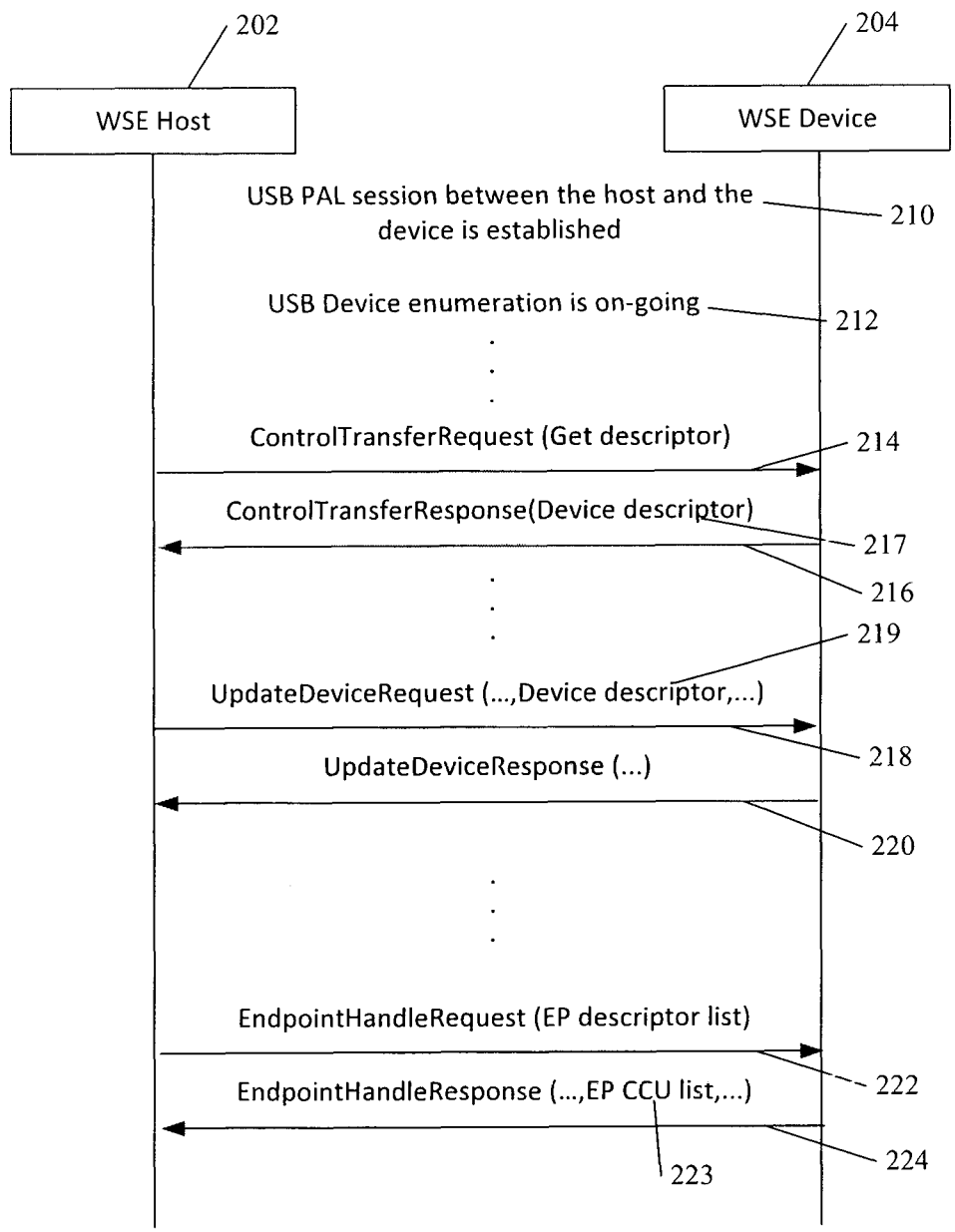
FIG. 2 is a schematic illustration of a sequence of communications between a Wireless-Gigabit (WiGig) Serial Extension (WSE) host, and a WSE device, in accordance with some demonstrative embodiments.

Reference is made to FIG. 2, which schematically illustrates a sequence of communications between a WSE host 202, and a WSE device 204, in accordance with some demonstrative embodiments. For example, PAL communication unit 130 (FIG. 1) may perform the functionality of WSE host 202, and/or PAL communication unit 131 (FIG. 1) may perform the functionality of WSE device 204.

In some demonstrative embodiments, WSE host 202 and WSE device 204 may establish a session 210.

In some demonstrative embodiments, WSE host 202 and WSE device 204 may perform an enumeration procedure 212, e.g., after the session 210 is established.

In some demonstrative embodiments, during the enumeration procedure WSE host 202 transmitting one or more control transfer requests 214 to WSE device 204. The control transfer requests 214 may include requests to one or more USB devices connected to WSE device 204 to provide USB descriptors of the USB devices. The USB descriptors may be tunneled by WSE device 204 to WSE host 202.

In some demonstrative embodiments, during the enumeration procedure WSE device 204 may transmit one or more control transfer responses 216 to WSE host 202. The control transfer responses 216 may include the device descriptors 217 of the USB devices.

In some demonstrative embodiments, WSE host 202 may transmit to WSE device 204 one or more messages explicitly including the USB device descriptors of one or more USB devices.

In some demonstrative embodiments, WSE host 202 may transmit to WSE device 204 at least one Update Device Request message 218 including the USB device descriptor 219 of at least one USB device. Device descriptor 219 may be included, for example, in a device descriptor portion having, for example, a width of 18 bytes.

In some demonstrative embodiments, WSE device 204 may transmit an Update Device Response message 220, e.g., in response to the Update Device Request message 218.

In some demonstrative embodiments, WSE host 202 may transmit to WSE device 204 an endpoint handle request message 222. The endpoint handle request message 222 may include, for example, a list of endpoint descriptors corresponding to a plurality of endpoints.

Alternatively, WSE host 202 may transmit to WSE device 204 a plurality of endpoint handle request messages 222 including the endpoint descriptors corresponding to the plurality of endpoints.

In some demonstrative embodiments, WSE device 204 may determine one or more endpoint-specific values, e.g., a plurality of CCU values, to be defined with respect to the plurality of endpoints. WSE device 204 may determine the CCU values, for example, based on the endpoint descriptors corresponding to the plurality of endpoints.

In some demonstrative embodiments, WSE device 204 may determine one or more of the CCU values to be defined with respect to the plurality of endpoints based on the USB device descriptors and/or any other information, e.g., as described above.

In some demonstrative embodiments, WSE device 204 may transmit to WSE host 202 an endpoint handle response 224 including the plurality of CCU values defined with respect to the plurality of endpoints, e.g., in the form of an EP CCU list 223. Alternatively, WSE device 204 may transmit to WSE host 202 a plurality of endpoint handle responses 224 including the plurality of CCU values.

Figure 3:
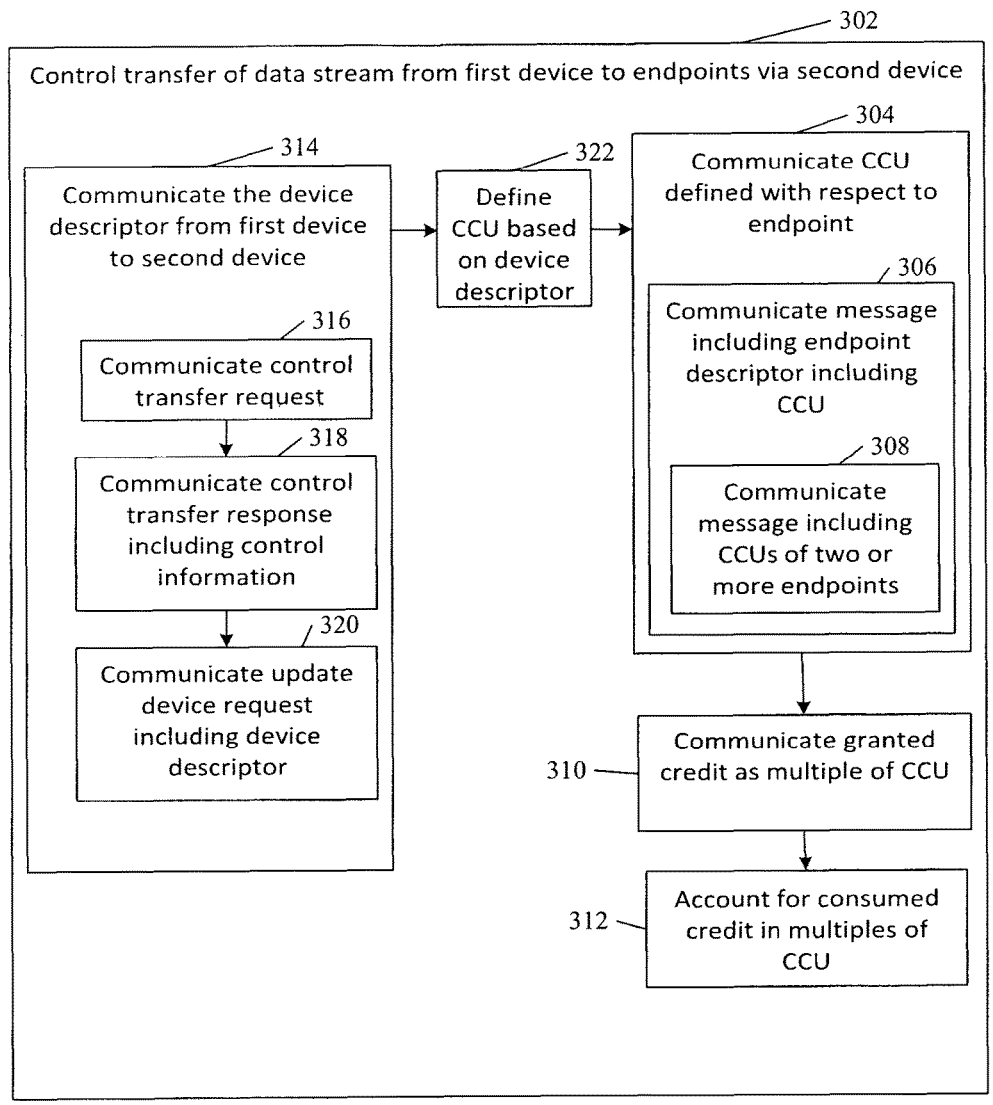
FIG. 3 is a schematic flow-chart illustration of a method of controlling data flow, in accordance with some demonstrative embodiments.

Reference is made to FIG. 3, which schematically illustrates a method of controlling data flow, in accordance with some demonstrative embodiments. In some embodiments, one or more of the operations of the method of FIG. 3 may be performed by a system, e.g., system 100 (FIG. 1); a device, e.g., device 102 (FIG. 1) and/or device 104 (FIG. 1); a PAL communication unit, e.g., PAL communication unit 130 (FIG. 1) and/or PAL communication unit 131 (FIG. 1); a WSE host, e.g., WSE host 202 (FIG. 2); and/or a WSE device, e.g., WSE device 204 (FIG. 2).

As indicated at block 302, the method may include controlling the transfer of a stream of data, including data to be delivered to a plurality of endpoints, from a first device to a second device over a communication link. For example, PAL communication units 130 and 131 (FIG. 1) may control the transfer of a stream of data including data intended for endpoints 134, 135, 136, 138 and/or 140 (FIG. 1) from device 102 (FIG. 1) to device 104 (FIG. 1), e.g., as described above.

As indicated at block 304, controlling the transfer of the stream of data may include communicating between the first and second devices at least one endpoint-specific CCU defined with respect to at least one endpoint. For example, PAL communication unit 131 (FIG. 1) may transmit to PAL communication unit 130 (FIG. 1) at least one message including at least one CCU defined with respect to at least one endpoint of endpoints 134, 135, 136, 138 and/or 140 (FIG. 1), e.g., as described above.

As indicated at block 306, communicating the CCU may include communicating at least one message including at least one endpoint descriptor corresponding to the at least one endpoint, the endpoint descriptor including the defined with respect to the endpoint. For example, WSE device 204 (FIG. 2) may transmit to WSE host 202 (FIG. 2) endpoint handle response 224 (FIG. 2) including the CCU defined with respect to the endpoint, e.g., as described above.

As indicated at block 308, communicating the message may include communicating a message including two or more CCUs defined with respect to two or more endpoints. For example, WSE device 204 (FIG. 2) may transmit to WSE host 202 (FIG. 2) endpoint handle response 224 (FIG. 2) including EP CCU list 223 (FIG. 2), e.g., as described above.

As indicated at block 310, controlling the transfer of the stream of data may include communicating a message including granted credit, which is allocated with respect to the endpoint and represented as a multiple of the CCU defined for the endpoint. For example, PAL communication unit 131 (FIG. 1) may transmit to PAL communication unit 130 (FIG. 1) a message allocating credit for the endpoint as a multiple of the CCU defined for the endpoint, e.g., as described above.

As indicated at block 312, controlling the transfer of the stream of data may include accounting for consumed credits for the endpoint in multiples of the CCU. For example, PAL communication unit 130 (FIG. 1) may account for data transferred to the endpoint based on the CCU defined for the endpoint, e.g., regardless of an amount of data to be transferred to the endpoint, as described above.

As indicated at block 314, controlling the transfer of the stream of data may include communicating from the first device to the second device a device descriptor of at least one device including at least one endpoint. For example, PAL communication unit 130 (FIG. 1) may transmit to PAL communication unit 131 (FIG. 1) at least one message explicitly including the device descriptor of a USB device, e.g., as described above.

As indicated at block 316, communicating the device descriptor may include communicating at least one control transfer request from the first device to the second device. For example, the control transfer request may include a request to the second device to transfer to the first device control information including the device descriptor of a device. For example, WSE host 202 (FIG. 2) may transmit to WSE device 204 (FIG. 2) control transfer request 214 (FIG. 2), e.g., as described above.

As indicated at block 318, communicating the device descriptor may include communicating at least one control transfer response from the second device to the first device, the control transfer response including the control information. For example, WSE device 204 (FIG. 2) may transmit to WSE host 202 (FIG. 2) control transfer response 216 (FIG. 2) including device descriptor 217 (FIG. 2), e.g., as described above.

As indicated at block 320, communicating the device descriptor may include communicating at least one update device request from the first device to the second device, the update device request including the device descriptor. For example, WSE host 202 (FIG. 2) may transmit to WSE device 204 (FIG. 2) update device request 219 (FIG. 2) including device descriptor 219 (FIG. 2), e.g., a described above.

As indicated at block 322, controlling the transfer of the stream of data may include defining the CCU corresponding to the endpoint based on the device descriptor. For example, PAL communication unit 131 (FIG. 1) may define the CCU of the endpoint based on the device descriptor received from PAL communication unit 131 (FIG. 1), e.g., as described above.

Figure 4:
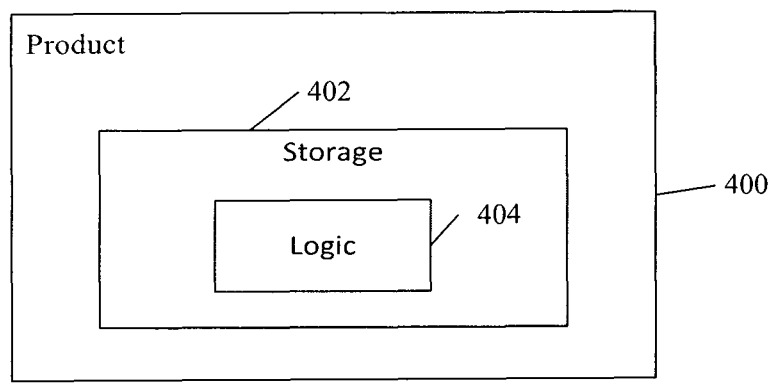
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), device 104 (FIG. 1), PAL communication unit 130 (FIG. 1), and/or PAL communication unit 131 (FIG. 1), to perform one or more of the operations FIG. 2, and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a communication unit to communicate data between a first device and a second device over a communication link, the data including data to be delivered from the first device to a plurality of endpoints via the second device, wherein the communication unit is to communicate between the first and second devices at least one message including at least one endpoint descriptor corresponding to at least one endpoint of the plurality of endpoints, the endpoint descriptor including a credit consumption unit (CCU) defined with respect to the endpoint.

Example 2 includes the subject matter of Example 1 and optionally, wherein the message includes two or more endpoint descriptors corresponding to two or more endpoints of the plurality of endpoints, and wherein the two or more endpoint descriptors include two or more different CCUs defined with respect to the two or more endpoints.

Example 3 includes the subject matter of Example 1 or 2 and optionally, wherein the CCU defines a unit by which the first device is to keep track of buffer space available on the second device for buffering data for the endpoint.

Example 4 includes the subject matter of any one of Examples 1-3 and optionally, wherein the communication unit is to receive the message and to account for consumed credits for the endpoint in multiples of the CCU, regardless of an amount of data to be transferred from the first device to the endpoint.

Example 5 includes the subject matter of any one of Examples 1-3 and optionally, wherein the communication unit is to transmit the message and to transmit a message including granted credit, which is allocated with respect to the endpoint, the granted credit is represented as a multiple of the CCU.

Example 6 includes the subject matter of any one of Examples 1-5 and optionally, wherein the communication unit is to communicate between the second and first devices a message including granted credit, which is allocated with respect to the endpoint, wherein the granted credit is represented as a multiple of the CCU.

Example 7 includes the subject matter of any one of Examples 1-6 and optionally, wherein the message includes an endpoint handle response.

Example 8 includes the subject matter of Example 7 and optionally, wherein the communication unit is to communicate at least one endpoint handle request from the first device to the second device, the endpoint handle request including an endpoint descriptor of the endpoint, and wherein the endpoint handle response includes the CCU of the endpoint.

Example 9 includes the subject matter of any one of Examples 1-8 and optionally, wherein the communication unit is to communicate an update device request from the first device to the second device, the update device request including a device descriptor of a Universal-Serial-Bus (USB) device including the endpoint.

Example 10 includes the subject matter of Example 9 and optionally, wherein the communication unit is to define the CCU based on the device descriptor.

Example 11 includes the subject matter of any one of Examples 1-10 and optionally, wherein the communication unit is to communicate a control transfer request from the first device to the second device, the control transfer request requesting the second device to transfer to the first device control information including a device descriptor of a device including one or more of the plurality of endpoints, wherein the communication unit is to communicate a control transfer response from the second device to the first device, the control transfer response including the control information, and wherein the communication unit is to communicate an update device request from the first device to the second device, the update device request including the device descriptor.

Example 12 includes the subject matter of any one of Examples 1-11 and optionally, wherein the first device comprises a host Universal Serial Bus (USB) Protocol Adaptation Layer (PAL), and wherein the second device comprises a Device USB PAL.

Example 13 includes the subject matter of any one of Examples 1-12 and optionally, wherein the communication link comprises a wireless communication link.

Example 14 includes the subject matter of Example 13 and optionally, wherein the wireless communication link comprises a wireless gigabit (WiGig) link.

Example 15 includes the subject matter of any one of Examples 1-14 and optionally, wherein the first device comprises a WiGig Serial Extension (WSE) host, and wherein the second device comprises a WSE Device.

Example, 16 includes an apparatus of communicating data, the apparatus comprising a communication unit to communicate data between a first device and a second device over a communication link, the data including data to be delivered from the first device to a plurality of endpoints via the second device, the communication unit is to communicate from the first device to the second device a message including a device descriptor of at least one device including at least one endpoint.

Example 17 includes the subject matter of Example 16 and optionally, wherein the device descriptor indicates one or more characteristics of the device including the endpoint.

Example 18 includes the subject matter of Example 16 or 17 and optionally, wherein the communication unit is to communicate at least one control transfer request from the first device to the second device, the control transfer request to request the second device to transfer to the first device control information including a device descriptor of the device including the endpoint, and wherein the communication unit is to communicate at least one control transfer response from the second device to the first device, the control transfer response including the control information.

Example 19 includes the subject matter of any one of Examples 16-18 and optionally, wherein the communication unit is to communicate at least one update device request from the first device to the second device, the update device request including the device descriptor.

Example 20 includes the subject matter of any one of Examples 16-19 and optionally, wherein the communication unit is to communicate between the first and second devices at least one message including at least one endpoint descriptor corresponding to the at least one endpoint, the endpoint descriptor including a credit consumption unit (CCU) defined with respect to the endpoint.

Example 21 includes the subject matter of Example 20 and optionally, wherein the CCU is based on the device descriptor.

Example 22 includes the subject matter of any one of Examples 16-21 and optionally, wherein the first device comprises a host Universal Serial Bus (USB) Protocol Adaptation Layer (PAL), and wherein the second device comprises a Device USB PAL.

Example 23 includes the subject matter of any one of Examples 16-22 and optionally, wherein the communication link comprises a wireless communication link.

Example 24 includes the subject matter of Example 23 and optionally, wherein the wireless communication link comprises a wireless gigabit (WiGig) link.

Example 25 includes the subject matter of any one of Examples 16-24 and optionally, wherein the first device comprises a WiGig Serial Extension (WSE) host, and wherein the second device comprises a WSE Device.

Example 26 includes a communication system comprising a device comprising:

a network interface to communicate over a network; and a wireless gigabit (WiGig) Serial Extension (WSE) controller to perform the functionality of a WSE host or a WSE device to communicate Universal Serial Bus (USB) data between a USB host and a USB device over the network, the data including data to be delivered from the USB host to a plurality of endpoints of the USB device, wherein the WSE controller is to communicate between the host and WSE device at least one message including at least one endpoint descriptor corresponding to at least one endpoint of the plurality of endpoints, the endpoint descriptor including a credit consumption unit (CCU) defined with respect to the endpoint.

Example 27 includes the subject matter of Example 26 and optionally, wherein the message includes two or more endpoint descriptors corresponding to two or more endpoints of the plurality of endpoints, and wherein the two or more endpoint descriptors include two or more different CCUs defined with respect to the two or more endpoints.

Example 28 includes the subject matter of Example 26 or 27 and optionally, wherein the CCU defines a unit by which the WSE host is to keep track of buffer space available on the WSE device for buffering data for the endpoint.

Example 29 includes the subject matter of any one of Examples 26-28 and optionally, wherein the WSE controller is to receive the message and to account for consumed credits for the endpoint in multiples of the CCU, regardless of an amount of data to be transferred from the WSE host to the endpoint.

Example 30 includes the subject matter of any one of Examples 26-29 and optionally, wherein the WSE controller is to transmit the message and to transmit a message including granted credit, which is allocated with respect to the endpoint, the granted credit is represented as a multiple of the CCU.

Example 31 includes the subject matter of any one of Examples 26-30 and optionally, wherein the WSE controller is to communicate between the WSE device and WSE host a message including granted credit, which is allocated with respect to the endpoint, wherein the granted credit is represented as a multiple of the CCU.

Example 32 includes the subject matter of any one of Examples 26-31 and optionally, wherein the message includes an endpoint handle response.

Example 33 includes the subject matter of Example 32 and optionally, wherein the WSE controller is to communicate at least one endpoint handle request from the WSE host to the WSE device, the endpoint handle request including an endpoint descriptor of the endpoint, and wherein the endpoint handle response includes the CCU of the endpoint.

Example 34 includes the subject matter of any one of Examples 26-33 and optionally, wherein the WSE controller is to communicate an update device request from the WSE host to the WSE device, the update device request including a device descriptor of the USB device.

Example 35 includes the subject matter of Example 34 and optionally, wherein the WSE controller is to define the CCU based on the device descriptor.

Example 36 includes the subject matter of any one of Examples 26-35 and optionally, wherein the WSE controller is to communicate a control transfer request from the WSE host to the WSE device, the control transfer request requesting the WSE device to transfer to the WSE host control information including a device descriptor of a device including one or more of the plurality of endpoints, wherein the WSE controller is to communicate a control transfer response from the WSE device to the WSE host, the control transfer response including the control information, and wherein the WSE controller is to communicate an update device request from the WSE host to the WSE device, the update device request including the device descriptor.

Example 37 includes the subject matter of any one of Examples 26-36 and optionally, wherein the network interface comprises a wireless communication unit.

Example 38 includes a communication system comprising a device comprising a network interface to communicate over a network; and a wireless gigabit (WiGig) Serial Extension (WSE) controller to perform the functionality of a WSE host or a WSE device to communicate Universal Serial Bus (USB) data between a USB host and a USB device over the network, the data including data to be delivered from the USB host to a plurality of endpoints of the USB device, wherein the WSE controller is to communicate from the WSE host to the WSE device a message including a device descriptor of the USB device.

Example 39 includes the subject matter of Example 38 and optionally, wherein the device descriptor indicates one or more characteristics of the USB device.

Example 40 includes the subject matter of Example 38 or 39 and optionally, wherein the WSE controller is to communicate at least one control transfer request from the WSE host to the WSE device, the control transfer request to request the WSE device to transfer to the WSE host control information including a device descriptor of the USB device, and wherein the WSE controller is to communicate at least one control transfer response from the WSE device to the WSE host, the control transfer response including the control information.

Example 41 includes the subject matter of any one of Examples 38-40 and optionally, wherein the WSE controller is to communicate at least one update device request from the WSE host to the WSE device, the update device request including the device descriptor.

Example 42 includes the subject matter of any one of Examples 38-41 and optionally, wherein the WSE controller is to communicate between the WSE host and WSE device at least one message including at least one endpoint descriptor corresponding to the at least one endpoint, the endpoint descriptor including a credit consumption unit (CCU) defined with respect to the endpoint.

Example 43 includes the subject matter of Example 42 and optionally, wherein the CCU is based on the device descriptor.

Example 44 includes the subject matter of any one of Examples 38-43 and optionally, wherein the network interface comprises a wireless communication unit.

Example 45 includes a method of communication, the method comprising controlling the transfer of a stream of data from a first device to a second device over a communication link, the stream of data including data to be delivered to a plurality of endpoints, the controlling including communicating between the first and second devices at least one message including at least one endpoint-specific credit consumption unit (CCU) defined with respect to at least one endpoint of the plurality of endpoints.

Example 46 includes the subject matter of Example 45 and optionally, wherein the message includes two or more endpoint descriptors corresponding to two or more endpoints of the plurality of endpoints, and wherein the two or more endpoint descriptors include two or more different CCUs defined with respect to the two or more endpoints.

Example 47 includes the subject matter of Example 45 or 46 and optionally, wherein the CCU defines a unit by which the first device is to keep track of buffer space available on the second device for buffering data for the endpoint.

Example 48 includes the subject matter of any one of Examples 45-47 and optionally, comprising receiving the message, and accounting for consumed credits for the endpoint in multiples of the CCU, regardless of an amount of data to be transferred from the first device to the endpoint.

Example 49 includes the subject matter of any one of Examples 45-48 and optionally, comprising transmitting the message, and transmitting a message including granted credit, which is allocated with respect to the endpoint, the granted credit is represented as a multiple of the CCU.

Example 50 includes the subject matter of any one of Examples 45-49 and optionally, comprising communicating between the second and first devices a message including granted credit, which is allocated with respect to the endpoint, wherein the granted credit is represented as a multiple of the CCU.

Example 51 includes the subject matter of any one of Examples 45-50 and optionally, wherein the message includes an endpoint handle response.

Example 52 includes the subject matter of Example 51 and optionally, comprising communicating at least one endpoint handle request from the first device to the second device, the endpoint handle request including an endpoint descriptor of the endpoint, and wherein the endpoint handle response includes the CCU of the endpoint.

Example 53 includes the subject matter of any one of Examples 45-52 and optionally, comprising communicating an update device request from the first device to the second device, the update device request including a device descriptor of a Universal-Serial-Bus (USB) device including the endpoint.

Example 54 includes the subject matter of Example 53 and optionally, comprising defining the CCU based on the device descriptor.

Example 55 includes the subject matter of any one of Examples 45-54 and optionally, comprising communicating a control transfer request from the first device to the second device, the control transfer request requesting the second device to transfer to the first device control information including a device descriptor of a device including one or more of the plurality of endpoints; communicating a control transfer response from the second device to the first device, the control transfer response including the control information; and communicating an update device request from the first device to the second device, the update device request including the device descriptor.

Example 56 includes the subject matter of any one of Examples 45-55 and optionally, wherein the first device comprises a host Universal Serial Bus (USB) Protocol Adaptation Layer (PAL), and wherein the second device comprises a Device USB PAL.

Example 57 includes the subject matter of any one of Examples 45-56 and optionally, wherein the communication link comprises a wireless communication link.

Example 58 includes the subject matter of Example 57 and optionally, wherein the wireless communication link comprises a wireless gigabit (WiGig) link.

Example 59 includes the subject matter of any one of Examples 45-58 and optionally, wherein the first device comprises a WiGig Serial Extension (WSE) host, and wherein the second device comprises a WSE Device.

Example 60 includes a method of communication, the method comprising controlling the transfer of a stream of data from a first device to a second device over a communication network, the stream of data including data to be delivered to a plurality of endpoints, the controlling including communicating from the first device to the second device a message including a device descriptor of at least one device including at least one endpoint.

Example 61 includes the subject matter of Example 60 and optionally, wherein the device descriptor indicates one or more characteristics of the device including the endpoint.

Example 62 includes the subject matter of Example 60 or 61 and optionally, comprising communicating at least one control transfer request from the first device to the second device, the control transfer request to request the second device to transfer to the first device control information including a device descriptor of the device including the endpoint; and communicating at least one control transfer response from the second device to the first device, the control transfer response including the control information.

Example 63 includes the subject matter of any one of Examples 60-62 and optionally, comprising communicating at least one update device request from the first device to the second device, the update device request including the device descriptor.

Example 64 includes the subject matter of any one of Examples 60-63 and optionally, comprising communicating between the first and second devices at least one message including at least one endpoint descriptor corresponding to the at least one endpoint, the endpoint descriptor including a credit consumption unit (CCU) defined with respect to the endpoint.

Example 65 includes the subject matter of Example 64 and optionally, wherein the CCU is based on the device descriptor.

Example 66 includes the subject matter of any one of Examples 60-65 and optionally, wherein the first device comprises a host Universal Serial Bus (USB) Protocol Adaptation Layer (PAL), and wherein the second device comprises a Device USB PAL.

Example 67 includes the subject matter of any one of Examples 60-66 and optionally, wherein the communication link comprises a wireless communication link.

Example 68 includes the subject matter of Example 67 and optionally, wherein the wireless communication link comprises a wireless gigabit (WiGig) link.

Example 69 includes the subject matter of any one of Examples 60-68 and optionally, wherein the first device comprises a WiGig Serial Extension (WSE) host, and wherein the second device comprises a WSE Device.

Example 70 includes a product including a non-transitory storage medium having stored thereon instructions that, when executed by a machine, result in controlling the transfer of a stream of data from a first device to a second device over a communication link, the stream of data including data to be delivered to a plurality of endpoints, the controlling including communicating between the first and second devices at least one message including at least one endpoint-specific credit consumption unit (CCU) defined with respect to at least one endpoint of the plurality of endpoints.

Example 71 includes the subject matter of Example 70 and optionally, wherein the message includes two or more endpoint descriptors corresponding to two or more endpoints of the plurality of endpoints, and wherein the two or more endpoint descriptors include two or more different CCUs defined with respect to the two or more endpoints.

Example 72 includes the subject matter of Example 70 or 71 and optionally, wherein the CCU defines a unit by which the first device is to keep track of buffer space available on the second device for buffering data for the endpoint.

Example 73 includes the subject matter of any one of Examples 70-72 and optionally, wherein the instructions result in receiving the message, and accounting for consumed credits for the endpoint in multiples of the CCU, regardless of an amount of data to be transferred from the first device to the endpoint.

Example 74 includes the subject matter of any one of Examples 70-73 and optionally, wherein the instructions result in transmitting the message, and transmitting a message including granted credit, which is allocated with respect to the endpoint, the granted credit is represented as a multiple of the CCU.

Example 75 includes the subject matter of any one of Examples 70-74 and optionally, wherein the instructions result in communicating between the second and first devices a message including granted credit, which is allocated with respect to the endpoint, wherein the granted credit is represented as a multiple of the CCU.

Example 76 includes the subject matter of any one of Examples 70-75 and optionally, wherein the message includes an endpoint handle response.

Example 77 includes the subject matter of Example 76 and optionally, wherein the instructions result in communicating at least one endpoint handle request from the first device to the second device, the endpoint handle request including an endpoint descriptor of the endpoint, and wherein the endpoint handle response includes the CCU of the endpoint.

Example 78 includes the subject matter of any one of Examples 70-77 and optionally, wherein the instructions result in communicating an update device request from the first device to the second device, the update device request including a device descriptor of a Universal-Serial-Bus (USB) device including the endpoint.

Example 79 includes the subject matter of Example 78 and optionally, wherein the instructions result in defining the CCU based on the device descriptor.

Example 80 includes the subject matter of any one of Examples 70-79 and optionally, wherein the instructions result in communicating a control transfer request from the first device to the second device, the control transfer request requesting the second device to transfer to the first device control information including a device descriptor of a device including one or more of the plurality of endpoints; communicating a control transfer response from the second device to the first device, the control transfer response including the control information; and communicating an update device request from the first device to the second device, the update device request including the device descriptor.

Example 81 includes the subject matter of any one of Examples 70-80 and optionally, wherein the first device comprises a host Universal Serial Bus (USB) Protocol Adaptation Layer (PAL), and wherein the second device comprises a Device USB PAL.

Example 82 includes the subject matter of any one of Examples 70-81 and optionally, wherein the communication link comprises a wireless communication link.

Example 83 includes the subject matter of Example 82 and optionally, wherein the wireless communication link comprises a wireless gigabit (WiGig) link.

Example 84 includes the subject matter of any one of Examples 70-83 and optionally, wherein the first device comprises a WiGig Serial Extension (WSE) host, and wherein the second device comprises a WSE Device.

Example 85 includes a product including a non-transitory storage medium having stored thereon instructions that, when executed by a machine, result in controlling the transfer of a stream of data from a first device to a second device over a communication network, the stream of data including data to be delivered to a plurality of endpoints, the controlling including communicating from the first device to the second device a message including a device descriptor of at least one device including at least one endpoint.

Example 86 includes the subject matter of Example 85 and optionally, wherein the device descriptor indicates one or more characteristics of the device including the endpoint.

Example 87 includes the subject matter of Example 85 or 86 and optionally, wherein the instructions result in communicating at least one control transfer request from the first device to the second device, the control transfer request to request the second device to transfer to the first device control information including a device descriptor of the device including the endpoint; and communicating at least one control transfer response from the second device to the first device, the control transfer response including the control information.

Example 88 includes the subject matter of any one of Examples 85-87 and optionally, wherein the instructions result in communicating at least one update device request from the first device to the second device, the update device request including the device descriptor.

Example 89 includes the subject matter of any one of Examples 85-88 and optionally, wherein the instructions result in communicating between the first and second devices at least one message including at least one endpoint descriptor corresponding to the at least one endpoint, the endpoint descriptor including a credit consumption unit (CCU) defined with respect to the endpoint.

Example 90 includes the subject matter of Example 89 and optionally, wherein the CCU is based on the device descriptor.

Example 91 includes the subject matter of any one of Examples 85-90 and optionally, wherein the first device comprises a host Universal Serial Bus (USB) Protocol Adaptation Layer (PAL), and wherein the second device comprises a Device USB PAL.

Example 92 includes the subject matter of any one of Examples 85-91 and optionally, wherein the communication link comprises a wireless communication link.

Example 93 includes the subject matter of Example 92 and optionally, wherein the wireless communication link comprises a wireless gigabit (WiGig) link.

Example 94 includes the subject matter of any one of Examples 85-93 and optionally, wherein the first device comprises a WiGig Serial Extension (WSE) host, and wherein the second device comprises a WSE Device.

Example 95 includes an apparatus of communication, the apparatus comprising means for controlling the transfer of a stream of data from a first device to a second device over a communication link, the stream of data including data to be delivered to a plurality of endpoints, the controlling including communicating between the first and second devices at least one message including at least one endpoint-specific credit consumption unit (CCU) defined with respect to at least one endpoint of the plurality of endpoints.

Example 96 includes the subject matter of Example 95 and optionally, wherein the message includes two or more endpoint descriptors corresponding to two or more endpoints of the plurality of endpoints, and wherein the two or more endpoint descriptors include two or more different CCUs defined with respect to the two or more endpoints.

Example 97 includes the subject matter of Example 95 or 96 and optionally, wherein the CCU defines a unit by which the first device is to keep track of buffer space available on the second device for buffering data for the endpoint.

Example 98 includes the subject matter of any one of Examples 95-97 and optionally, comprising means for receiving the message, and accounting for consumed credits for the endpoint in multiples of the CCU, regardless of an amount of data to be transferred from the first device to the endpoint.

Example 99 includes the subject matter of any one of Examples 95-98 and optionally, comprising means for transmitting the message, and transmitting a message including granted credit, which is allocated with respect to the endpoint, the granted credit is represented as a multiple of the CCU.

Example 100 includes the subject matter of any one of Examples 95-99 and optionally, comprising means for communicating between the second and first devices a message including granted credit, which is allocated with respect to the endpoint, wherein the granted credit is represented as a multiple of the CCU.

Example 101 includes the subject matter of any one of Examples 95-100 and optionally, wherein the message includes an endpoint handle response.

Example 102 includes the subject matter of Example 101 and optionally, comprising means for communicating at least one endpoint handle request from the first device to the second device, the endpoint handle request including an endpoint descriptor of the endpoint, and wherein the endpoint handle response includes the CCU of the endpoint.

Example 103 includes the subject matter of any one of Examples 95-101 and optionally, comprising means for communicating an update device request from the first device to the second device, the update device request including a device descriptor of a Universal-Serial-Bus (USB) device including the endpoint.

Example 104 includes the subject matter of Example 103 and optionally, comprising means for defining the CCU based on the device descriptor.

Example 105 includes the subject matter of any one of Examples 95-104 and optionally, comprising means for communicating a control transfer request from the first device to the second device, the control transfer request requesting the second device to transfer to the first device control information including a device descriptor of a device including one or more of the plurality of endpoints; means for communicating a control transfer response from the second device to the first device, the control transfer response including the control information; and means for communicating an update device request from the first device to the second device, the update device request including the device descriptor.

Example 106 includes the subject matter of any one of Examples 95-105 and optionally, wherein the first device comprises a host Universal Serial Bus (USB) Protocol Adaptation Layer (PAL), and wherein the second device comprises a Device USB PAL.

Example 107 includes the subject matter of any one of Examples 95-106 and optionally, wherein the communication link comprises a wireless communication link.

Example 108 includes the subject matter of Example 107 and optionally, wherein the wireless communication link comprises a wireless gigabit (WiGig) link.

Example 109 includes the subject matter of any one of Examples 95-108 and optionally, wherein the first device comprises a WiGig Serial Extension (WSE) host, and wherein the second device comprises a WSE Device.

Example 110 includes an apparatus of communication, the apparatus comprising means for controlling the transfer of a stream of data from a first device to a second device over a communication network, the stream of data including data to be delivered to a plurality of endpoints, the controlling including communicating from the first device to the second device a message including a device descriptor of at least one device including at least one endpoint.

Example 111 includes the subject matter of Example 110 and optionally, wherein the device descriptor indicates one or more characteristics of the device including the endpoint.

Example 112 includes the subject matter of Example 110 or 111 and optionally, comprising means for communicating at least one control transfer request from the first device to the second device, the control transfer request to request the second device to transfer to the first device control information including a device descriptor of the device including the endpoint; and means for communicating at least one control transfer response from the second device to the first device, the control transfer response including the control information.

Example 113 includes the subject matter of any one of Examples 110-112 and optionally, comprising means for communicating at least one update device request from the first device to the second device, the update device request including the device descriptor.

Example 114 includes the subject matter of any one of Examples 110-113 and optionally, comprising means for communicating between the first and second devices at least one message including at least one endpoint descriptor corresponding to the at least one endpoint, the endpoint descriptor including a credit consumption unit (CCU) defined with respect to the endpoint.

Example 115 includes the subject matter of Example 114 and optionally, wherein the CCU is based on the device descriptor.

Example 116 includes the subject matter of any one of Examples 110-115 and optionally, wherein the first device comprises a host Universal Serial Bus (USB) Protocol Adaptation Layer (PAL), and wherein the second device comprises a Device USB PAL.

Example 117 includes the subject matter of any one of Examples 110-116 and optionally, wherein the communication link comprises a wireless communication link.

Example 118 includes the subject matter of Example 117 and optionally, wherein the wireless communication link comprises a wireless gigabit (WiGig) link.

Example 119 includes the subject matter of any one of Examples 110-118 and optionally, wherein the first device comprises a WiGig Serial Extension (WSE) host, and wherein the second device comprises a WSE Device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising a memory and a processor, the processor configured to cause a Universal Serial Bus (USB) Protocol Adaptation Layer (PAL) host of a media-agnostic connectivity PAL to:
   transmit to a USB PAL device an endpoint handle request to assign one or more handles to one or more endpoints of a USB device, the endpoint handle request comprising one or more endpoint descriptors corresponding to the one or more endpoints;
   process an endpoint handle response from the USB PAL device, the endpoint handle response comprising the one or more handles of the one or more endpoints, and one or more credit consumption units (CCUs) corresponding to the one or more endpoints; and
   track an available buffer space of the USB PAL device for an endpoint based on a CCU of said one of more CCUs corresponding to the endpoint.

2. The apparatus of claim 1, wherein said processor is configured to account for consumed credits for said endpoint in multiples of the CCU corresponding to the endpoint.

3. The apparatus of claim 1, wherein said processor is configured to account for consumed credits for said endpoint in multiples of the CCU corresponding to the endpoint, regardless of an actual number of bytes to be transmitted by the USB PAL host.

4. The apparatus of claim 1, wherein said processor is configured to process a message from the USB PAL device, the message comprising a credit grant for the endpoint, the credit grant comprising a multiple of the CCU corresponding to the endpoint.

5. The apparatus of claim 1, wherein the processor is configured to cause the USB PAL host to transmit an update device request to the USB PAL device, the update device request comprising a USB device descriptor of the USB device.

6. The apparatus of claim 5, wherein the USB device descriptor of the USB device is to indicate one or more characteristics of the USB device.

7. The apparatus of claim 1, wherein a combination of an address of the USB PAL device and a handle of the endpoint uniquely identifies said endpoint within a service set.

8. The apparatus of claim 1, wherein the PAL is configured to enable media-agnostic connectivity between a USB host and one or more USB devices.

9. The apparatus of claim 1, wherein the processor is configured to control a PAL connection, over the PAL, between the USB PAL host and the USB PAL device, said PAL is above a data link layer.

10. The apparatus of claim 1 comprising a Media Access Control (MAC) component and a Physical Layer (PHY) component.

11. The apparatus of claim 1 comprising a radio.

12. The apparatus of claim 1 comprising a network interface.

13. The apparatus of claim 1 comprising at least one antenna.

14. A product comprising one or more tangible computer-readable non-transitory storage media comprising computer-executable instructions operable to, when executed by at least one computer processor, enable the at least one computer processor to cause a Universal Serial Bus (USB) Protocol Adaptation Layer (PAL) host of a media-agnostic connectivity PAL to:
- transmit to a USB PAL device an endpoint handle request to assign one or more handles to one or more endpoints of a USB device, the endpoint handle request comprising one or more endpoint descriptors corresponding to the one or more endpoints;
- process an endpoint handle response from the USB PAL device, the endpoint handle response comprising the one or more handles of the one or more endpoints, and one or more credit consumption units (CCUs) corresponding to the one or more endpoints; and
- track an available buffer space of the USB PAL device for an endpoint based on a CCU of said one of more CCUs corresponding to the endpoint.

15. The product of claim 14, wherein the instructions, when executed, cause the USB PAL host to account for consumed credits for said endpoint in multiples of the CCU corresponding to the endpoint.

16. The product of claim 14, wherein the instructions, when executed, cause the USB PAL host to account for consumed credits for said endpoint in multiples of the CCU corresponding to the endpoint, regardless of an actual number of bytes to be transmitted by the USB PAL host.

17. The product of claim 14, wherein the instructions, when executed, cause the USB PAL host to process a message from the USB PAL device, the message comprising a credit grant for the endpoint, the credit grant comprising a multiple of the CCU corresponding to the endpoint.

18. The product of claim 14, wherein the instructions, when executed, cause the USB PAL host to transmit an update device request to the USB PAL device, the update device request comprising a USB device descriptor of the USB device.

19. The product of claim 18, wherein the USB device descriptor of the USB device is to indicate one or more characteristics of the USB device.

20. The product of claim 14, wherein a combination of an address of the USB PAL device and a handle of the endpoint uniquely identifies said endpoint within a service set.

21. The product of claim 14, wherein the instructions, when executed, cause the USB PAL host to control a PAL connection, over the PAL, between the USB PAL host and the USB PAL device, said PAL is above a data link layer.

22. An apparatus comprising a memory and a processor, the processor configured to cause a Universal Serial Bus (USB) Protocol Adaptation Layer (PAL) device of a media-agnostic connectivity PAL to:
- process an endpoint handle request from a USB PAL host, the endpoint handle request to request one or more handles to be assigned to one or more endpoints of a USB device, the endpoint handle request comprising one or more endpoint descriptors corresponding to the one or more endpoints;
- transmit an endpoint handle response to the USB PAL host, the endpoint handle response comprising the one or more handles of the one or more endpoints, and one or more credit consumption units (CCUs) corresponding to the one or more endpoints, a CCU of said one of more CCUs corresponding to an endpoint comprising a unit to track a buffer space of the USB PAL device for the endpoint; and
- transmit to the USB PAL host a message comprising a credit grant for the endpoint, the credit grant comprising a multiple of the CCU corresponding to the endpoint.

23. The apparatus of claim 22, wherein the one or more CCUs comprise one CCU for each respective endpoint of the plurality of endpoints.

24. The apparatus of claim 22, wherein the processor is configured to cause the USB PAL device to allocate a plurality of credit allocations corresponding to the plurality of endpoints.

25. The apparatus of claim 22, wherein the processor is configured to cause the USB PAL device to process an update device request from the USB PAL host, the update device request comprising a USB device descriptor of the USB device.

26. The apparatus of claim 25, wherein the USB device descriptor of the USB device is to indicate one or more characteristics of the USB device.

27. The apparatus of claim 22, wherein a combination of an address of the USB PAL device and a handle of the endpoint uniquely identifies said endpoint within a service set.

28. The apparatus of claim 22, wherein the PAL is configured to enable media agnostic connectivity between a USB host and one or more USB devices.

29. The apparatus of claim 22, wherein the processor is configured to control a PAL connection, over the PAL, between the USB PAL host and the USB PAL device, said PAL is above a data link layer.

30. The apparatus of claim 22 comprising a Media Access Control (MAC) component and a Physical Layer (PHY) component.

31. The apparatus of claim 22 comprising a radio.

32. The apparatus of claim 22 comprising a network interface.

33. The apparatus of claim 22 comprising at least one antenna.

34. A product comprising one or more tangible computer-readable non-transitory storage media comprising computer-executable instructions operable to, when executed by at least one computer processor, enable the at least one computer processor to cause a Universal Serial Bus (USB) Protocol Adaptation Layer (PAL) device of a media-agnostic connectivity PAL to:
- process an endpoint handle request from a USB PAL host, the endpoint handle request to request one or more handles to be assigned to one or more endpoints of a USB device, the endpoint handle request comprising one or more endpoint descriptors corresponding to the one or more endpoints;
- transmit an endpoint handle response to the USB PAL host, the endpoint handle response comprising the one or more handles of the one or more endpoints, and one or more credit consumption units (CCUs) corresponding to the one or more endpoints, a CCU of said one of more CCUs corresponding to an endpoint comprising a unit to track a buffer space of the USB PAL device for the endpoint; and
- transmit to the USB PAL host a message comprising a credit grant for the endpoint, the credit grant comprising a multiple of the CCU corresponding to the endpoint.

35. The product of claim 34, wherein the one or more CCUs comprise one CCU for each respective endpoint of the plurality of endpoints.

36. The product of claim 34, wherein the instructions, when executed, cause the USB PAL device to allocate a plurality of credit allocations corresponding to the plurality of endpoints.

37. The product of claim 34, wherein the instructions, when executed, cause the USB PAL device to process an update device request from the USB PAL host, the update device request comprising a USB device descriptor of the USB device.

38. The product of claim 37, wherein the USB device descriptor of the USB device is to indicate one or more characteristics of the USB device.

39. The product of claim 34, wherein a combination of an address of the USB PAL device and a handle of the endpoint uniquely identifies said endpoint within a service set.

40. The product of claim 34, wherein the instructions, when executed, cause the USB PAL device to control a PAL connection, over the PAL, between the USB PAL host and the USB PAL device, said PAL is above a data link layer.

* * * * *